C. G. SMITH.
SPRING WHEEL FOR VEHICLES.
APPLICATION FILED MAY 17, 1912. RENEWED JUNE 20, 1914.

1,131,616.

Patented Mar. 9, 1915.

Witnesses
Otto E. Hoddick.
C. H. Rossner.

Inventor
Cicero G. Smith.
By A. J. O'Brien
Attorney

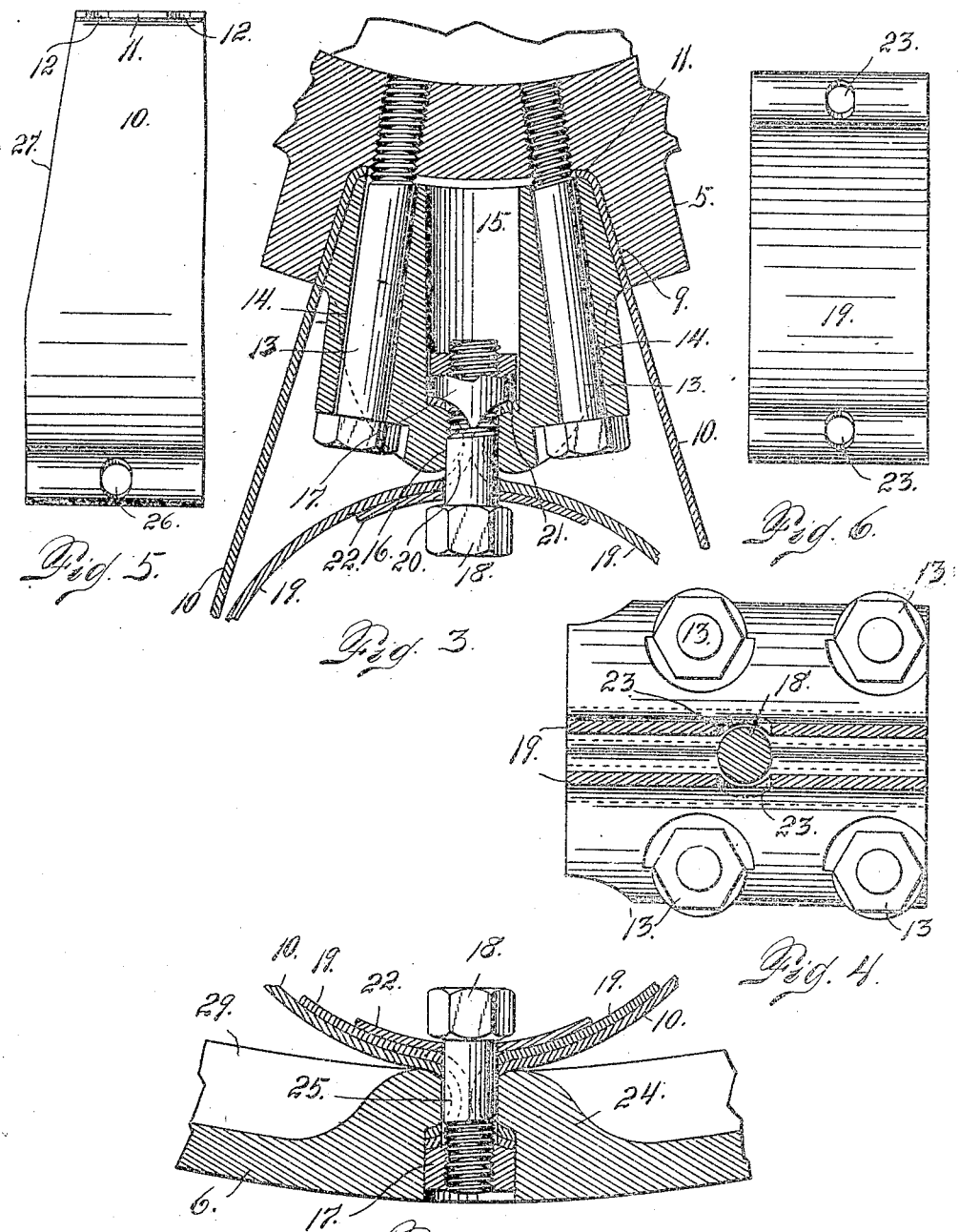

UNITED STATES PATENT OFFICE.

CICERO G. SMITH, OF PALISADE, COLORADO, ASSIGNOR TO SMITH SPRING WHEEL COMPANY, OF ALBUQUERQUE, NEW MEXICO, A CORPORATION OF ARIZONA.

SPRING-WHEEL FOR VEHICLES.

1,131,616.  Specification of Letters Patent.  Patented Mar. 9, 1915.

Application filed May 17, 1912, Serial No. 697,908. Renewed June 20, 1914. Serial No. 846,858.

*To all whom it may concern:*

Be it known that I, CICERO G. SMITH, citizen of the United States, residing at Palisade, in the county of Mesa and State of Colorado, have invented certain new and useful Improvements in Spring-Wheels for Vehicles; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in spring wheels for vehicles and may be considered an improvement over the constructions set forth in my previous application Serial No. 651,662, filed September 27, 1911, and my applications, Serial Nos. 680,479 and 680,480, filed February 28, 1912.

My present improvement consists primarily in the means for attaching the spring members to the rim and the hub of the wheel. The general arrangement of my spring member is substantially the same as that shown in my previous applications, that is to say, I provide a resilient ring made of flat spring metal and spring spokes made of the same material and arranged to bear against the ring on its outer sides and along the greater part of its periphery.

The novel features not disclosed in my previous applications are a wedge by means of which I fasten the inner ends of the spring spokes to the hub, and the bolts having nuts one face of which is wedge or arrow shaped to form cam surfaces for bearing against the extremities of the spring members and forcing them against the projections on the hub wedge and rim boss, thus securely holding the spring members in place.

Having briefly outlined my improved construction, I will proceed to describe the same in detail, reference being made to the accompanying drawings in which is illustrated an embodiment thereof.

Figure 1:
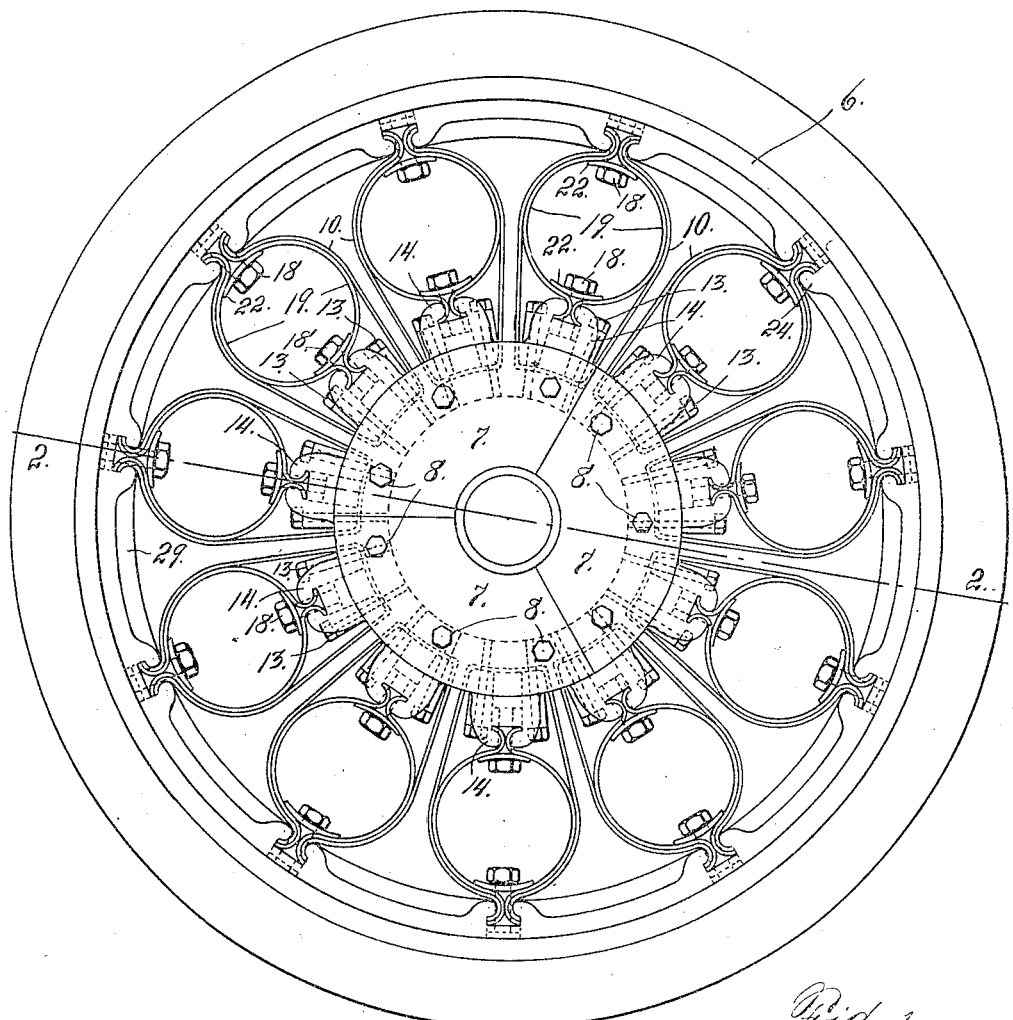
Figure 2:
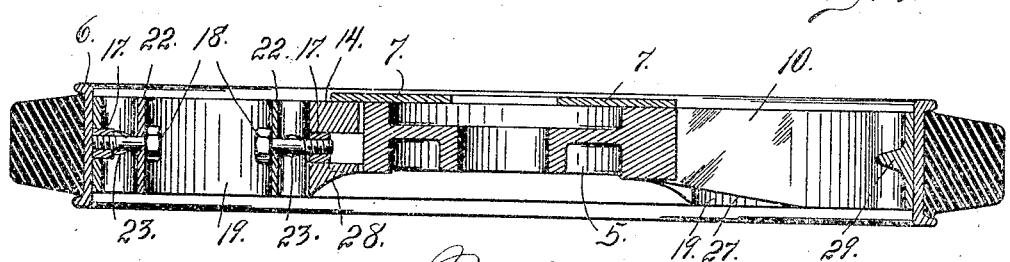

In this drawing: Figure 1 is a side elevation of my improved spring wheel for vehicles. Fig. 2 is a section taken approximately on the line 2—2 of Fig. 1. Figs. 3 and 3ᴀ are fragmentary views partly in section of a portion of the wheel showing the details of the bolts, nuts and wedge. Fig. 4 is a section taken on the line 4—4 of Fig. 3, looking in the direction of the arrows. Fig. 5 is a side elevation of the spring spoke. Fig. 6 is a side elevation of one member of the spring ring.

The same reference numerals refer to the same parts in all the views.

Let the numeral 5 designate the hub and 6 the rim of the wheel. The hub is composed of a body member as shown in detail in Fig. 2 with reinforcing plates 7 secured upon one side by means of bolts 8 or other suitable fastenings. The hub is provided at regular intervals with wedge-shaped recesses 9 into which extend the inner extremities of spring spokes 10 having portions 11 bent to lie upon the bases of the recesses 9. The bent portions 11 are cut away at 12, (see Fig. 5), for the reception of bolts 13. Wedge-shaped blocks 14 are provided for each of the recesses 9, the blocks being arranged to bear upon the inner sides of the spring spokes 10 to hold the latter in place in the recesses. The wedge block 14 has an opening extending axially therethrough, the inner portion 15 of which is larger in cross section than the outer portion 16 as it is designed to receive the nut 17 while the portion 16 is intended to receive the bolt 18 only. Fitting within the spring spokes 10 and bearing within the spring spokes 10 and bearing against them throughout the lower portion of their length is a spring ring composed of two members 19, the ends of which are hook-shaped as shown. In each block 14 there is a recess 20 extending entirely across the block and shaped to conform to the hook-shaped ends of the members 19. This recess 20 is constricted at its mouth to a width approximately equal to twice the thickness of the members 19. One side of the nut 17 is wedge or arrow shaped to provide cam surfaces 21. The curved plate or washer 22 is provided to lap adjoining plates 19 and to form a bearing for the head of the bolt 18. The members 19 are cut away at 23 in order to receive the bolts 18.

The bolts and nuts used for fastening the parts 10 and 19 to the rim are duplicates of those used for securing the members 19 at the hub and have, therefore, been given the same reference numbers. A detailed description of the fastenings at the rim would, therefore, be superfluous. It may, however, be stated that bosses 24 are formed upon the rim at points radially opposite the wedge blocks 14 and that they are provided with recesses 25 similar to the recess 20 but of twice the width at their mouths in order to accommodate the spring spokes 10 as well as the ring members 19. The spokes 10 have openings 26 similar to the openings 23 in the members 19 and for a like purpose.

By reference to Fig. 2 it may be seen that the hub 5 is thinner than the rim 6 and is located substantially flush with one side of the rim. The spring spokes are also beveled off as shown at 27 and the blocks 14 are cut away as shown at 28, Fig. 2, so as to conform in width at their inner extremities with the width of the hub. This is for the purpose of providing a space upon one side of the hub to accommodate a brake drum. I preferably reinforce the rim of my wheel by a web 29.

From the foregoing description, the use and operation of my improved construction will be readily understood. It is, of course, apparent that in assembling my wheel, the nuts 17 will be prevented from rotating by reason of the engagement of the curved surfaces of the nuts with the correspondingly curved surfaces of the extremities of the spring members and that upon tightening the bolts, the curved extremities of the spring members will be forced apart and against the coöperating walls of the recesses, thus locking the parts securely in position.

Having thus described my invention, what I claim is:—

1. In a wheel, the combination with a rim and hub having openings facing each other, the openings being constricted at their mouths, spring members the ends of which are hook-shaped to fit around the constrictions of said openings, bolts in said openings and nuts into which said bolts are threaded, each of said nuts having a concave face adapted to engage one of said spring members.

2. In a wheel, flat spring members, said wheel having an opening constricted at its mouth into which two of said spring members extend, a nut in the larger part of said opening and having a wedge-shaped face extending in the direction of the mouth of the opening and a bolt threaded into said nut.

3. In a wheel, a flat spring member having a hook-shaped extremity, said wheel having an opening constricted at its mouth into which said hook-shaped extremity extends, one side of said opening being of a shape the counterpart of said hook-shaped extremity, a nut in said opening, a bolt extending into said opening and threaded into said nut, said nut having a cam face adapted, when the bolt is tightened, to lock said hook-shaped extremity against the side of the opening.

4. In a spring wheel, a hub and rim, a circular spring member between said hub and rim, spring spokes engaging the sides of said circular spring member, said hub having a wedge-shaped opening into which said spokes extend, a wedge secured in said opening and a bolt for securing said circular spring member to said wedge.

5. In a spring wheel, a hub and rim, a spring ring between said hub and rim, said ring being formed of two members having hook-shaped extremities, spring spokes engaging the outer sides of said ring, said hub having a wedge shaped opening into which said spokes extend, a wedge secured in said opening, said wedge having a recess into which said hook-shaped extremities extend, the sides of said recess being shaped to conform to the shape of the hook-shaped extremities, a nut in said opening, a bolt extending into said opening and threaded into said nut, said nut having cam faces adapted, when the bolt is tightened, to lock the hook-shaped extremities against the sides of the recess, and means for securing the spring ring and spring spokes to the rim.

In testimony whereof I affix my signature in presence of two witnesses.

CICERO G. SMITH.

Witnesses:
A. J. O'BRIEN,
A. E. ADAMS.